R. H. CHASE.

DEVICE FOR SUPPORTING AND DELIVERING PAPER FOR WRAPPING OR BUNDLING PURPOSES.

APPLICATION FILED JULY 22, 1908.

13,309.

Reissued Nov. 7, 1911.

Witnesses
Edwin Lucr
Robert H. Kammler.

Inventor:
Reuben H. Chase,
by Emery and Booth Attys.

UNITED STATES PATENT OFFICE.

REUBEN H. CHASE, OF DENVER, COLORADO, ASSIGNOR, BY MESNE ASSIGNMENTS, TO NATIONAL BINDING MACHINE COMPANY, OF BOSTON, MASSACHUSETTS, A CORPORATION OF MAINE.

DEVICE FOR SUPPORTING AND DELIVERING PAPER FOR WRAPPING OR BUNDLING PURPOSES.

13,309. Specification of Reissued Letters Patent. Reissued Nov. 7, 1911.

Original No. 830,206, dated September 4, 1906, Serial No. 236,800. Application for reissue filed July 22, 1908. Serial No. 444,872.

*To all whom it may concern:*

Be it known that I, REUBEN H. CHASE, a citizen of the United States, formerly residing at Boston, in the county of Suffolk and State of Massachusetts, and now residing at Denver, State of Colorado, have invented an Improvement in Devices for Supporting and Delivering Paper for Wrapping or Bundling Purposes, of which the following description, in connection with the accompanying drawings, is a specification, like characters on the drawings representing like parts.

This invention has for its object the production of an improved apparatus by which to deliver a gummed strip in any desired length to be used for wrapping bundles, the strip being employed instead of usual string or india-rubber bands.

The particular features of which my invention consists will be hereinafter described, and fully pointed out in the claims at the end of this specification.

Figure 1:
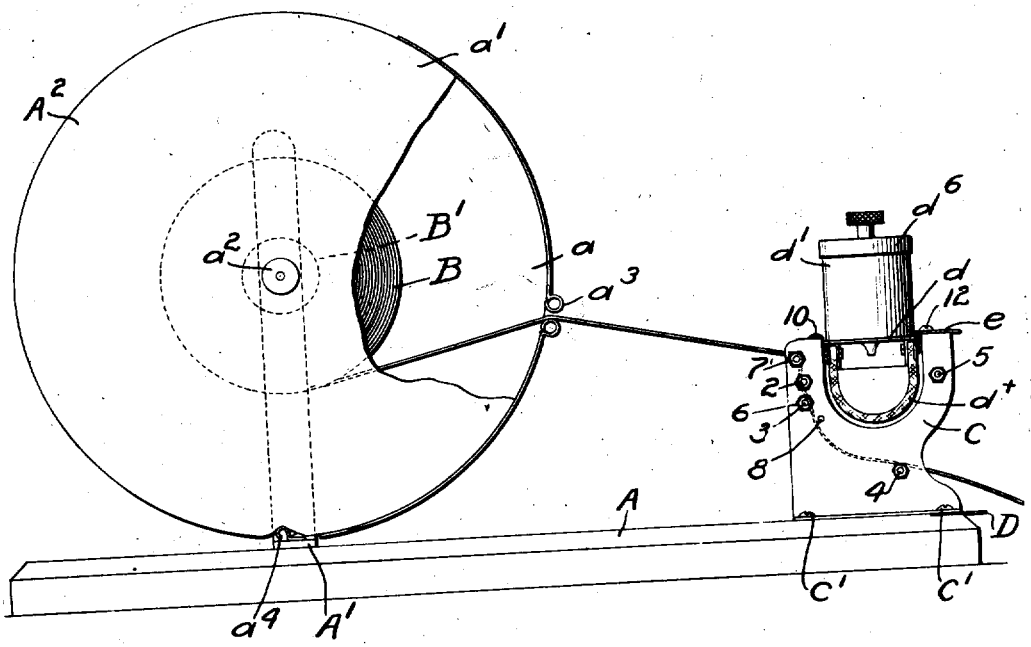
Figure 2:
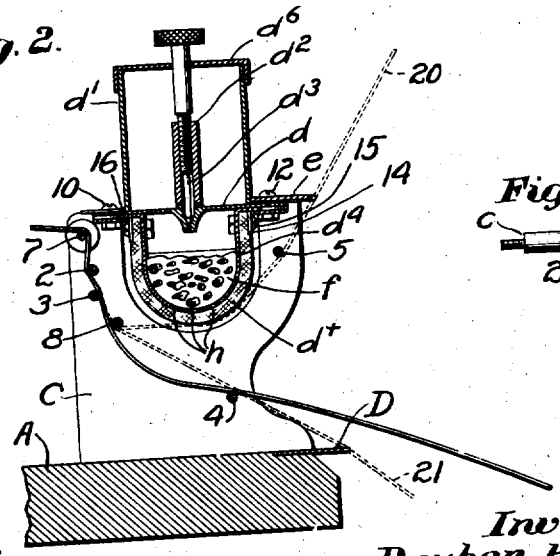
Figure 3:
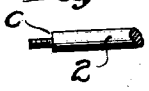

Figure 1 in side elevation, the liquid containing box being in section, illustrates an apparatus embodying my invention; Fig. 2 is a somewhat enlarged section of the moistening means; and Fig. 3 shows the end of one of the tie-rods.

Referring to the drawings, A represents a base-plate or bed, to which is secured a standard A′ of any suitable shape, that supports a casing $A^2$, the standard having a central stud that receives over it a roll of paper B, preferably on a wooden spool B′. The stud is of sufficient length to receive a plurality of spools, each spool containing, it may be, a gummed strip of paper of a definite width, the width of the two strips varying.

When a plurality of rolls of paper are used, I separate the rolls by means of a disk *a* also sustained by the stud and I apply a second disk *a′* to the outer side of the outermost roll of paper, securing the same by means of a thumb nut $a^2$ or otherwise. The casing has a mouth $a^3$, through which the gummed strip is led to the moistening device, to be described. The rotation of the disks *a* and *a′* is restrained by means of a disk-locking device $a^4$.

At or near the end of the base I erect suitable standards for sustaining the moistening means. The standards herein shown comprise two side plates C, represented as flanged outwardly at their lower ends and connected to the base by screws C′. The side plates are connected rigidly by means of tie rods 2, 3, 4, and 5. These tie rods consist of pieces of metal shouldered at or near one end, as at *c*, Fig. 3, and threaded to receive suitable nuts 6, the shoulders of the rods abutting the inner sides of the standards, as shown.

Above the tie rod 2 I have mounted a strip-sustaining rod 7, it being provided, as represented, with a loose washer adjustable longitudinally thereon, so that it may be moved on the rod at any desired distance from its end to thus accommodate a plurality of strips, the contiguous edges of the strips abutting the sides of the washer. The gummed strip, with its gummed side uppermost, is led over the rod 7 behind or to the left of the rod 2, thence across the rod 3 and under a roller 8. The rod 3 is so located with relation to the rod 2 and roller 8 that the gummed and stiffened strip is bent as it travels between the rod 2 and roller 8, and this bend serves to give the strip a tendency to drop upon the rod 4, and, further, the rod 3, when the strip is released after the same has been cut off, prevents the movement of the strip too far to the left, viewing Fig. 2, and the rod 2 at the other side of the strip prevents the approach of the strip toward the moistening device when the strip is cut off. The free end of the strip normally drops on the tie-rod 4, which constitutes a strip-support or stop for the strip back of its free end.

The bed at its end and at one side of the stand referred to has secured thereto a strip cutter D, shown as a toothed piece of metal, which is herein represented as secured to the bed by some of the screws employed for securing the standard to the bed. The upper ends of the standards have connected to them by screws 10 and 12 the part of the bottom plate $d$ of the tank $d'$ which contains the water to be delivered to the fibrous covering $d^x$ of the moistening device.

The interior of the box has a tube $d^2$ that receives the stem of what I shall designate a "needle-valve" $d^3$, it having a threaded shank and a tapering point, the rotation of the stem leaving more or less space about the tapering point to control the amount of water to drop through the tube onto a sponge $f$, which is deposited in a U-shaped trough $d^4$, forming the body of the moistening device. The body of the moistening device at its lower side has a series of fine holes $h$, so that the water which is permitted to drop through the needle-valve onto the sponge may be given up slowly and flow through said holes and enter the fibrous covering $d^x$ applied to the exterior of the body of the moistening device. The fibrous material is clamped to the body of the moistening device by cleats 14, held by screws 15. The upper part of the body of the moistening device is represented as having out-flaring lips 16 that enter guideways formed at the under side of the tank, so that the moistening device may be withdrawn from the apparatus whenever it is desired. The upper end of the needle-valve is extended through the tank-cover $d^6$ and is readily accessible to the hand of the user, and the cover may be raised whenever it is desired to supply water to the tank.

Fig. 1, in full lines, shows the apparatus in its normal condition. A clerk or other person being desirous of wrapping a bundle will engage the free end of the gummed paper and will push the same backwardly a little, as indicated by dotted lines, Fig. 1, and will then raise the strip, putting the gummed side thereof close to the point where the thumb and forefinger are holding the strip against the moistened under side of the fibrous covering of the moistening device and will pull the strip upwardly in the direction of the dotted line 20, pulling off more or less of the strip according to the size of the bundle to be wrapped, and when the strip has been pulled off for the desired length the clerk will drop the same into the dotted-line position 21 and will cut off the strip by the lower knife. In some instances, however, it will be desirable to cut off the strip by an upward movement, and in such event I have provided the top of the stand with a second or auxiliary cutting plate $e$, shown as a saw-toothed piece of metal held in position by screws 12.

Prior to my invention I am not aware that a gummed strip has ever been drawn from a roll underneath a moistening device to moisten the gummed side of the strip and thereafter cut off the strip. When the strip is cut off by the lowermost cutting device, the dry end of the strip remains in position on the strip-sustaining rod 4. If, however, the strip is cut off by an upward movement, then the strip immediately drops on said rod, due to its weight and gravity.

Having fully described my invention, what I claim as new, and desire to secure by Letters Patent, is—

1. In apparatus of the class described, a tank, a moistening device located below said tank, a plurality of rods between and over which to draw a strip on its way to be acted upon by the moistening device, means for cutting off the moistened strip, and a device to sustain the end of the strip below and out of contact with the moistening device.

2. In apparatus of the class described, a tank; a moistening device therebelow having an exterior fibrous covering, rods over which the strip to be moistened is drawn, and means for cutting off the moistened strip.

3. In apparatus of the class described, a tank, a moistening device therebelow having an exterior fibrous covering, and a sponge located in said moistening device, rods over which the strip to be moistened is drawn, and means for cutting off the moistened strip.

4. In apparatus of the class described, a tank having means such as a needle-valve to control the outflow of water therefrom, a non-rotatable moistening device therebelow presenting a series of perforations in its body, and an exterior textile cover.

5. In apparatus of the class described, a holder for a supply of elastic tape; a device for rendering the tape adhesive; a stationary guide for the tape set between the supply and said device, holding the tape normally out of contact therewith.

6. In apparatus of the class described, a holder for a supply of tape, and a moistening device for one surface of the tape, in combination with a layer of elastic adhesive material dried upon said surface of the tape, whereby the tape is rendered elastic, and a non-yielding guide leading the tape to a position adjacent to but not in contact with the moistening device, whereby the unmoistened portion of the tape automatically retracts from said device after contact therewith.

7. An apparatus for serving gummed tape in indefinite lengths for package sealing purposes, comprising in combination a gummed tape support, a tape moistening device for moistening the tape as it is drawn there-across, and fixed tape guiding means intermediate the said tape support and the moistening device and arranged to guide the tape on its way to the moistening device, said fixed tape guiding means being in proximity to the moistening device and so positioned with relation thereto that the gummed tape may when manually drawn upon for service and before severance, be brought into effective moistening contact with the moistening device, and means in proximity to the moistening device for cutting off the moistened end of the tape.

8. An apparatus for serving gummed tape in indefinite lengths for package sealing purposes, comprising in combination a gummed tape support, a tape moistening device for moistening the tape as it is drawn there-across, and tape guiding means between the said tape support and the moistening device and co-acting with the tape to permit the separation of the tape and moistening device upon tape severance, said guiding means being arranged to permit manual deflection of the tape when drawn upon for service and before severance, into effective moistening contact with said moistening device, and tape severing means in proximity to the moistening device and upon the same side of the service path of the tape as said moistening device.

9. An apparatus of the character specified comprising a moistening device in the service path of the strip and having a face exposed for engagement therewith of the strip to be moistened and a reinforcing or backing piece for the moistener to support the same in the proper moistening position, the strip when not being drawn upon being supported out of contact with the moistener.

10. An apparatus of the character specified comprising a strip moistener in the service path of the strip, means to guide the strip to said moistener, and a strip severing means located in proximity to the moistener, the construction and location of parts being such that during the severing action the strip is out of contact with the moistener.

11. An apparatus of the character specified comprising a strip moistener in the service path of the strip, a strip support at one side of the moistener, and a strip severing means adjacent the other side of the moistener, the construction of parts being such that during the severing action the strip is out of contact with the moistener.

12. An apparatus of the character specified comprising a frame, a strip moistener mounted thereon in the service path of the strip, means to guide a strip to the moistener, and a strip severing means supported by the frame, the construction of parts being such that during the severing action the strip is out of contact with the moistener.

13. An apparatus of the character specified comprising a support for a strip of paper or the like, a moistener in the service path of the strip, guiding means for the strip between the support therefor and the moistener, and a strip severing means located in proximitey to the moistener but spaced therefrom, the relative location of the moistener and the strip severing means being such that the operative pulls the strip in one direction to draw it across the moistener and then swings it in an arc to remove it from the moistener and to bring it into operative engagement with the severing means while removed from the moistener.

14. In an apparatus of the class described, means for holding a strip of paper in the form of a roll, means for moistening the gummed side of the strip, suitable uprights and a strip stop, and a series of rods between and about which the strip is so bent as to cause the strip near its free end to be drawn normally away from the moistening means and against said strip stop.

15. The combination with a strip support and a moistening device, of a plurality of fixed guiding devices arranged to guide the strip on its way to the moistening device, said guiding devices being in proximity to the moistening device and in such relative position that a dry guided strip may when drawn upon and before severance be brought into contact with the moistening device, and means to cut off the moistened strip.

16. Means for supporting a roll of gummed tape, a moistening device, fixed guiding means between the tape roll support and the moistening device and in such relative position that guided dry tape may when drawn upon and before severance be brought into contact with the moistening device, and strip severing means in proximity to the moistening device.

17. Means for supporting a roll of gummed tape, a tension device for the tape, a moistening device, fixed guiding means between the tape roll support and the moistening device and in such relative position that guided dry tape may when drawn upon and before severance be brought into contact with the moistening device, and strip severing means in proximity to the moistening device.

18. In combination with a support for a body of gummed tape, a moistener, stationary means for guiding the tape to the moistener, and tape severing means beyond the moistener in the path of travel of the tape, said moistener, severing means and stationary guiding means being in such relative position that the elasticity or resiliency of the tape will co-act to move the tape out of contact with the moistener after tape severance.

19. A strip serving apparatus comprising in combination a strip support, a strip moistener, guiding means between the strip support and the moistener, and co-acting with the strip to permit the separation of the strip and moistener upon strip severance, and strip severing means in proximity to the moistener and upon the same side of the service path of the strip as said moistener.

20. A strip severing apparatus comprising in combination a strip support, a strip moistener, stationary guiding means between the strip support and the moistener and in proximity thereto and co-acting with said strip to permit and assist in separation of the strip and moistener upon strip severance, and strip severing means in proximity to the moistener and upon the same side of the service path of the strip as said moistener.

21. A strip serving apparatus comprising in combination, a strip support, a strip moistener, guiding means between the strip and the moistener, and co-acting with the strip to permit the separation of the strip and moistener upon strip severance, and strip severing means adjacent the moistener and so positioned with respect to the service path of the strip that the strip may be deflected thereagainst for severance by the hand of the operator.

22. A strip serving device comprising in combination a strip support, a strip moistener, strip severing means adjacent the moistener, and stationary means to impart a transverse bend to the strip adjacent the moistener, thereby to coöperate to separate strip and moistener.

23. In apparatus of the class described, a holder for a supply of elastic tape, a device for rendering the tape adhesive, a stationary guide for the tape set between the supply and said device, holding the tape normally out of contact therewith, and strip severing means in proximity to the device for rendering the tape adhesive.

24. In apparatus of the class described, a holder for a supply of tape, a moistening device for one surface of the tape, in combination with a layer of adhesive material dried upon said surface of the tape, whereby the tape is rendered elastic, a non-yielding guide leading the tape to a position adjacent to but not in contact with the moistening device, whereby the unmoistened portion of the tape automatically retracts from said device after contact therewith, and a fixed strip severing blade against which the strip may be deflected by the hand of the operator for severance.

In testimony that I claim the foregoing as my invention, I have signed my name in the presence of two witnesses this 15th day of July A. D. 1908.

REUBEN H. CHASE.

Witnesses:
ISABEL M. STRONG,
CARLE WHITEHEAD.